Aug. 30, 1966 E. THOMAS 3,270,285

INFORMATION REINSERTION TELEGRAPH RECEIVERS

Filed July 23, 1962 3 Sheets-Sheet 1

INVENTOR
ELMER THOMAS

BY Hurvitz & Rose

ATTORNEYS

INFORMATION REINSERTION TELEGRAPH RECEIVERS

INVENTOR

ELMER THOMAS

BY Hurvitz & Rose

ATTORNEYS

Aug. 30, 1966 E. THOMAS 3,270,285

INFORMATION REINSERTION TELEGRAPH RECEIVERS

Filed July 23, 1962 3 Sheets-Sheet 3

INVENTOR
ELMER THOMAS

BY Hurvitz & Rose

ATTORNEYS

United States Patent Office 3,270,285
Patented August 30, 1966

3,270,285
INFORMATION REINSERTION TELEGRAPHY RECEIVERS

Elmer Thomas, Adelphi, Md., assignor to Page Communications Engineers, Inc., Washington, D.C., a corporation of Delaware Filed July 23, 1962, Ser. No. 211,777
14 Claims. (Cl. 325—320)

The present invention relates generally to systems of telegraphic communication, and more particularly to a double frequency shift keying telegraphic system having provision for re-inserting at the receiver of the system information lost, as by fading, of any one of the keyed frequencies employed.

A double frequency shift keying telegraphic system envisages four transmission frequencies and two reception channels. The frequencies are transmitted one at a time. Reception of a first frequency implies a mark condition in both channels, reception of a second frequency implies a mark condition in one channel and a space condition in the other; reception of a third frequency implies a space condition in the one channel and a mark condition in the other; and reception of the fourth frequency implies space conditions in both channels. A table indicating the relation of the frequencies to the conditions of the two receiver channels, whether mark (M) or space (S) is provided, for ready reference.

| Frequency | Channel 1 | Channel 2 |
|---|---|---|
| F1 | M | M |
| F2 | M | S |
| F3 | S | M |
| F4 | S | S |

In the prior art it has been sometimes assumed that fading of all the frequencies of a double frequency shift keying system occurs simultaneously. This assumption is incorrect and has led to a design philosophy for the system, in terms of its response to fading, which has resulted in inaccurate signal decoding during fading. In accordance with the present invention the assumption is made that only one frequency will fade at any one time, the other three frequencies being substantially unaffected. This assumption has been found to be statistically justified. The further assumption is made that the keying rate is much greater than the fading rate, or that a fading condition will subsist while a plurality of characters are being transmitted.

In accordance with the prior art system, exemplified in my U.S. Patent #2,999,925 issued September 12, 1961, and entitled, "Variable Decision Threshold Computer," absence of one frequency due to fading is compensated by means of information derived from the complementary frequency transmitted. Since four frequencies are employed in a double frequency shift keying system, however, absence of one frequency does not provide information as to which of the remaining frequencies is being transmitted, so that compensation must be accomplished in response to all of these. If the keying rates are sufficiently great in relation to fading rates, logic can be provided, in accordance with the present invention, to determine the probable transmitted but unreceived frequency, from the remaining received frequencies.

Additional difficulty is introduced by the consideration that one channel may be idling. Idling may occur or either space or mark, so that the entire transmitted signal retains its character as a double frequency shift keyed signal. But information as to the relative amplitudes of the two frequencies which are not being keyed is now unavailable so that ambiguity results. It is a feature of the present invention to remove the ambiguity.

The objects and features of the present invention may be achieved, as to certain aspects of these, by means of adaptations of circuitry disclosed in U.S. Patent #2,999,-925. In accordance with the teachings of that patent, a computer, in response to received single frequency shift keyed signals, provides equal D.C. voltages of opposite polarities, representative of mark and space conditions. During common types of fading and for commonly employed keying rates, one of the D.C. voltages is reduced in amplitude but their equality is maintained, by means of the circuitry of the patent, at a value equal to their average. Thereby a D.C. signal of considerable amplitude is maintained in each polarity even when one keyed frequency has faded, and which would, in absence of the circuitry of the patent, generate a zero or very small output. System signal detectability is thereby vastly improved. The computer referred to serves to provide equality of positive and negative signals, responsive to alternative shifted frequencies, only during relatively slow fading, when alternative frequencies may normally occur at random. Idling is evidenced by the transmission of a single frequency only, over a considerable time period. In response to this condition, the computer generates a D.C. output level which is greater than occurs during alternate keying, i.e. the averaging circuit is overridden.

If noise in a channel increases due to fading, it will not be of sufficiently great amplitude to effect keying of that channel unless it is greater than the average D.C. level established at, as a minimum, half the normal level, i.e. in absence of fading.

In the case of double frequency shift keying (DFSK) no alternate positive and negative D.C. signals are generated in response to incoming keyed signals, but only signals of one polarity. It is not possible, therefore, to average positive and negative D.C. levels to attain a half amplitude signal in response to absence of one of the levels, or a reduced average level in response to reduction of amplitude of either D.C. level. Otherwise stated, a DFSK system only positive pulses, for example, may be produced in response to receipt of all input frequencies and therefore, the signal summing concept employed in my prior patent to establish a threshold intermediate the peaks of positive and negative signals representative of incoming frequencies cannot be employed.

In accordance with one feature of the present invention, compensation for fading of a signal is effected by applying positive signals indicating receipt of each received frequency to a separate modified form of the computer employed in my aforementioned patent. The positive signals are stored in a capacitor arranged in a non-linear network such that upon occurrence of the next positive pulse, a positive pulse of an amplitude equal to one-half of the voltage across the capacitor is applied to a decision circuit. In the absence of a positive pulse, a negative output voltage of an amplitude equal to one-half the voltage developed across the capacitor by the prior positive pulse is caused to appear as an output voltage indicating that the associated frequency is not being received.

To obtain an indication that signal frequency F1 is being received, as a typical example, signals indicating the absence of input signals to the computers associated with frequencies F2, F3 and F4 are combined in a logic network. This logic network derives a signal indicative of the probable presence of F1. This signal is linearly combined with the output pulse of the computer in the F1 signal channel. In a similar manner, the output pulses derived from the F2, F3 and F4 computers, respectively, are combined with signals indicative of signal conditions at frequences F1, F3, F4 and F1, F2, F4 and F1, F2, F3, respectively. The combined signals are applied as inputs to a pair of differential amplifiers which derive mark and space signals for the first and second channels.

If one of the channels idles, a pair of the intelligence frequencies is absent for a prolonged period, while the other pair of frequencies alternates between present and absent states in response to mark and space variations on the channel which is not idling. A feature of the present invention is that the not-present signals, in addition to being derived in response to the outputs of the computers, are controlled by idling indicating signals generated in response to a relatively long absence of a pair of frequencies representing mark or space. The idling indicating signals are produced by sensing the absence of the four different frequency pairs which represent idling on mark and space conditions in the first and second channels. These not-present signals are employed to bias off the channel that is idling, so that the noise signals do not produce erroneous indications. In addition, idling condition produces a signal distinguishable from that due to alternate mark and space conditions, for further utilization of the system. Circuitry is provided to prevent more than one of the idling indicating signals from being generated at any one time, since only one channel can be idling when a signal is being received.

The logic requirement of the system must be capable of indicating that a particular frequency has been transmitted although absent at the receiver. The necessary information for application to the logic circuitry may be determined from any one of three possible sources. One of these sources is denominated not-present output, which indicates that a frequency has recently been transmitted and is presently absent as a result of a shift to one of the other three possible frequencies. Not keying bias circuits make up the other two sources, which provide that the transmission has been idling on one channel so that two of the frequencies have not recently been keyed, and are, therefore, most probably absent. The absent information is combined in OR gates and further combined in AND gates. By virtue of this circuitry three frequencies must be simultaneously absent to indicate that the remaining fourth frequency is most likely being transmitted. The absent information is added to the corresponding present information to provide a complete signal.

The described logic provide sufficient information to determine that a particular frequency is being transmitted, even in the event that the frequency has faded and is not being received.

In an actual system the frequency coding is impressed on a high frequency carrier as a subcarrier or modulation component. A superheterodyne type receiver is employed and demodulator input is obtained from the IF output of the receiver. The input circuitry of the receiver may consist of an amplifier to boost the signal to a level suitable for a translation and a peak limiter to prevent signal surges from overloading subsequent stages.

The frequency components are selected by sets of four identical filters, one filter for each of the four possible input frequencies, in the particular embodiment chosen for purposes of example only. Subsequent to filtering the four signal frequency components are amplified and detected separately. Various types of diversity capability may be provided. For example only, dual diversity capability may be provided by a second identical filter chassis operating from a common frequency synthesizer, or by other expedients known in the art. Diversity combination may be accomplished in a diode resistor circuit which provides a pseudo-ratio-square response. Following diversity combination each detected component may be assessed by a decision threshold computer to provide presence or absence information of each of the keyed signal components. Ambiguity, resulting from one of the binary information channels idling, is removed by not keying bias circuitry. This circuitry is capable of recognizing the four possible idling conditions and attenuates the appropriate frequency channel as well as applying an absent signal bias to the logic circuits. Absent signals from the logic circuits are combined in AND circuits so that the absence of any three frequencies provides information that the fourth is probably being transmitted, thus allowing a correct decision in respect to the fourth frequency when not received due to signal fading. Information on the various frequency channels is then combined in OR gates and differential amplifiers for application to the appropriate binary decision and output channel.

A low threshold trigger circuit in combination with a cathode follower may provide the output signal for terminal equipment.

It is, accordingly, an object of the present invention to provide a new and improved receiver system for multiple frequency shift keying signals, which system is especially adapted for double frequency shift keying.

Another object of the present invention is to provide a new and improved double frequency shift keying receiver in which errors due to noise on a fading signal on only one of the frequencies are greatly reduced.

An additional object of the present invention is to provide a new and improved double frequency shift key receiver utilizing a computer for each intelligence frequency, which computer derives unipolar impulses variable in amplitude relative to a reference, the amplitude of said impulses being determined only in part by the signal level of the causative input signal.

A further object of the present invention is to provide a double frequency shift key receiver in which errors due to fading of only one of the intelligence signals are greatly reduced, as are ambiguities which result when idling occurs on one channel.

Still another object of the present invention is to provide a new and improved double frequency shift keying receiver system in which errors due to noise on an idling intelligence channel are substantially eliminated.

The above and still further objects, features and advantages of the present invention will become apparent upon consideration of the following detail description of specific embodiments thereof, especially when taken in conjunction with the accompanying drawings, wherein.

Figure 1:
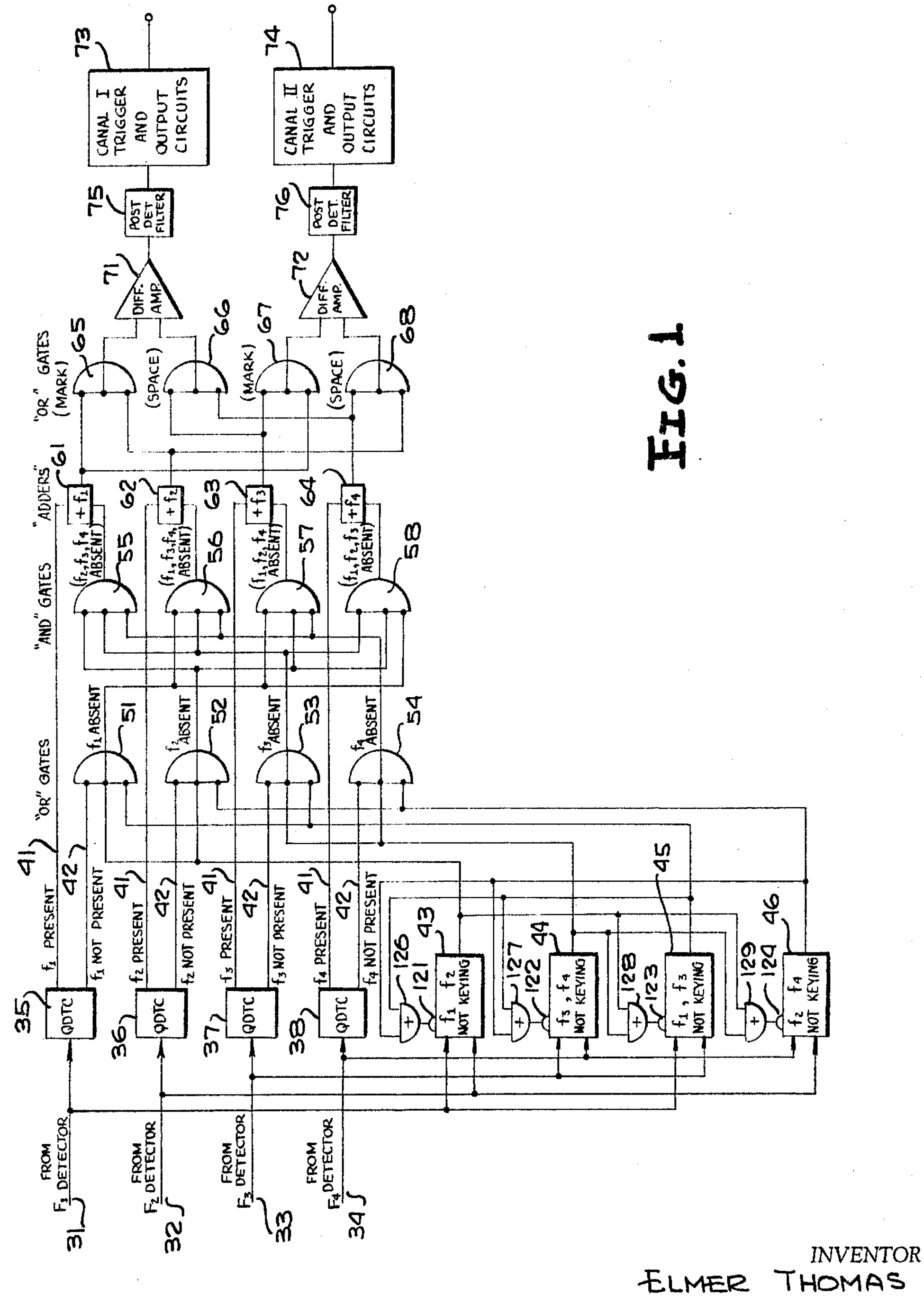
FIGURE 1 is a block diagram illustrating the logic of a computer according to the invention.

Reference is now made to FIGURE 1 of the accompanying drawings, wherein is illustrated, in block diagram, logic circuitry of a system in accordance with the invention. It is assumed, for purpose of explanation, that in response to reception of information bearing signals at frequencies F1, F2, F3 and F4, respectively, positive potential will appear on the leads 31, 32, 33 and 34, respectively, these leads being otherwise at ground potential. The signal appearing on the leads 31 to 34, respectively, are applied to Quadrature Decision Threshold Computers (QDTC) 35 to 38, respectively, which sense whether or not a positive signal appears on the input lead, and which provide output signals on leads 41, 42, on the basis that if a signal is present a positive signal will appear on lead 41 while if a signal is not present a positive signal will appear on lead 42. Considering then the QDTC circuit 35, if the frequency F1 is received an input signal will appear on lead 31, and in consequence a positive input signal will appear on output lead 41 and no signal or ground on lead 42. If frequency F1 is not received, lead 31 will remain at ground potential, lead 41 will have no signal thereon and lead 42 will have a positive signal thereon. A similar situation exists for the remaining QDTC circuits 36 to 38, inclusive.

It is now possible that one of the frequencies F1, F2, F3, F4 will be transmitted, but due to fading will not be received. While, in such case, the appertaining QDTC circuit will provide a not present signal on its lead 42, this signal will represent ambiguous information, since the not-present signal may be due either to fading or to non-transmission. It is one function of the logic circuitry of the present invention to correct error, or remove ambiguity, by reference to the concurrent transmissions on the remaining frequencies. In case of fading three remaining frequencies will be present, over a time period, and the fact that these three remaining frequencies are present over the time period, but are absent at a given instant of time, is taken to indicate that the fourth frequency was in fact transmitted at that instant of time, and was not received because of fading.

The further possibility exists, however, that one of the channels will be in idling condition. For example, if channel one is idling and channel two is transmitting and if idling condition in channel one is indicated by the transmission of mark signals, only the frequencies F1 and F2 need be transmitted by the system, since transmission of F1 indicates that channel one is marking and channel two is marking while transmission of frequency F2 indicates that channel one is marking and channel two is spacing. Frequencies F3 and F4 pertain to space conditions in channel one and are therefore not used. On the other hand, it may be possible that idling of channel one will be indicated by transmission of space signals. In this situation only frequencies F3 and F4 will be required, to indicate space conditions in channel one and mark and space conditions in channel two. It can then be determined by reference to the table hereinabove provided, indicating the relation of the frequencies to the condition of the two receiver channels, that, during idling conditions of one or the other channel, any of the following pairs of frequencies may be omitted, F1, F2; F3, F4; F1, F3; F2, F4.

Not keying coincidence gates 43 to 46 are provided, each of which includes two inputs deriving from the leads 31 to 34, inclusive. The gate 43 is connected to leads 31 and 32 and indicates coincidence of frequencies F1 and F2 in absent condition, over a substantial period of time. Circuitry of the gate 43 is so arranged that if no positive signal appears both on lead 31 and on lead 32 over a considerable period of time, an output signal will appear on the output of gate 43. If either signal F1 or F2 is received, resulting in positive signal on one of leads 31, 32, no output will be derived from gate 43. The fact that F1 and F2 are not being received implies that channel one is in space condition and is idling and does not indicate fading since it is assumed that fading will generally occur on only a single frequency at a time. The gates 44, 45 and 46 operate in respect to the frequency pairs F3, F4, F1, F3, F2, F4, respectively, in a similar manner to the gate 43 in respect to frequency pair F1, F2 and accordingly are not further described.

The not keying or complementary coincidence gates 43–46 are interconnected via feedback circuits so that only one output from all of them may be derived at a particular time. This is done to prevent erroneous indications that both channels are on sustained mark or space signals simultaneously, a state which is not expected at the transmitter. To this end, inhibit terminals 121–124 are provided on not keying gates 43–46, respectively. Each of the inhibit terminals 121–124 is responsive to the output of a separate one of OR gates 126–129. OR gates 126 and 127 are responsive to the outputs of not keying gates 45 and 46 so that the not keying outputs of gates 43 and 44 are inhibited when an output is derived from either of the not keying gates 45 or 46. Thereby, a signal indicative of sustained space or mark conditions on channel one is inhibited when a prior indication has been provided that channel two is on sustained mark of space operation. In a similar manner, OR gates 128 and 129 are responsive to the outputs of not-keying gates 43 and 44. Thereby the outputs of not-keying gates 45 and 46, indicative of channel two being on space and mark conditions, respectively, are inhibited when prior information is available that channel one is on sustained mark or space. It is not necessary to couple the outputs of gates 43 and 44 to the inhibit terminals of gates 44 and 43, respectively, since simultaneous and sustained mark and space conditions on channel one are not possible. Similarly, the idling indication outputs of channel two are not coupled to gates 45 and 46.

OR gates 51 to 54 inclusive, are provided to indicate absence of frequencies F1, F2, F3, F4, respectively, and operate each in accordance with the same general philosophy, which is explained in detail for OR gate 51. A first input to the OR gate 51 is the signal on lead 42, deriving from QDTC 35, which provides a positive signal when F1 is not present. Second and third inputs are provided from F1, F2 not keying gate 43 and from F1, F3 not keying gate 45. Accordingly, if F1 is absent because it has faded or if F1 is absent because it is not needed due to idling of a channel, output will be provided from OR gate 51. This output represents the fact that F1 is absent, regardless of the reason for the absence, and provides no information as to such reason, i.e. whether due to idling, or to absence of keying, or due to fading. The outputs of OR gates 51 to 54 are combined in AND gates 55 to 58, which are arranged to indicate absence of combinations of three frequencies. For example, the AND gate 55 is responsive to the outputs of OR gates 52, 53 and 54 and provides an output whenever frequencies F2, F3 and F4 are absent. AND gate 56 indicates the absence of frequencies F1, F3, F4; AND gate 57 indicates the absence of frequencies F1, F2, F4; and, AND gate 58 indicates the absence of frequencies F1, F2 and F3. It is then assumed, considering AND gate 55, that the simultaneous absence of frequencies F2, F3, F4, implies that F1 may be in process of transmission. Adders 61 to 64 are provided to add the missing frequency to the trio, if present. So, the adder 61 is connected to the output of the AND gate 55 and to the lead 41 deriving from QDTC 35 which indicates that F1 is present. Adder 62 adds F2 present information to the F1, F3, F4 absent information deriving from AND gate 56, and similarly adders 63 and 64 add F3 and F4 information to the outputs of AND gates 57, 58.

A further series of OR gates 65 to 68 is provided, OR gate 65 deriving input from adder 61 and 62; OR gate 66 deriving input from adder 63 and 64; OR gate 67 deriving input from adder 63 and 61 and the OR gate 68 deriving input from adder 64 and 62. The OR gates 65 and 66 proceed to differential amplifier 71, which provides respectively positive and negative output dependent upon whether the OR gate 65 or the OR gate 66 provides a larger input thereto. Similarly, the OR gates 67 and 68 proceed to the differential amplifier 72 which operates in a manner similar to the differential amplifier 71. The amplifiers 71, 72 proceed respectively via post detector filters 75 and 76 to trigger output circuits 73 and 74, which pertain respectively to the canals I and II.

Tracing out several typical cycles of operation, it is assumed that frequency F1 is being received at a given time, that neither channel is idling, and that no fading exists. In such case the frequencies F2, F3 and F4 will be absent. The QDTC circuits 35, 36, 37 and 38 will present at their output leads 41, 42 the following sequence of signals. F1 present will be indicated by a positive signal on lead 41 pertaining to QDTC 35. The remaining QDTC's will provide positive signals on their output leads 42 to indicate that the frequency pertaining to the QDTC is absent. The OR gates 51, 52, 53 and 54 will sense the array of signals present on the leads 41, 42 of the several QDTC's 35 to 38, inclusive, and at their outputs will then provide a zero for OR gate 51 and a positive pulse for each of the remaining outputs indicating that F1 is not absent while F2, F3 and F4 are absent. The outputs of the OR gates 51 to 54, inclusive, are applied to AND gates 55, 56, 57 and 58, inclusive. For the assumed condition that F1 is present, AND gate 55 will provide output indicating that F2, F3, F4 are absent while the remaining AND gates 56, 57 and 58 will all provide zero output since in each case F1 is present. In the adders 61–64, inclusive, the following occurs. Adders 61 finds an F2, F3, F4 absent signal as well as a positive signal deriving from lead 41 of QDTC 35. These signals add to provide a double amplitude positive output. This double amplitude positive output is applied to the OR gates 65 and 67. The remaining inputs to OR gates 65 derives from adder 62. This signal is represented by the sum of the zero signal present on lead 41 of QDTC 36, indicating that F2 is absent when the zero signal at the output of AND gate 56 indicates that F1 is not absent. Accordingly, the total output of OR gate 65 is a double amplitude positive output.

The OR gate 66 is responsive to signals on the leads 41 of QDTC 37 and 38, which are zero, the inputs to the adders 63 and 64, which provide input to the OR gate 66, are zero, since the leads 41 pertaining to QDTC 37 and 38 are zero, indicating that F3 and F4 are not present, while the outputs of AND gates 57 and 58 are zero, since F1 is present. Accordingly, the input to the differential amplifier 71 is positive at high level out of the OR gate 65 and zero out of the OR gate 66, providing a positive output into the post detector filter 75 and the triggering of the output circuit 73 to show a mark condition.

The OR gate 67 is supplied from the output of adder 61 and accordingly also contains as its one input a high level positive signal. The remaining input is a zero, as explained for OR gate 66. The OR gate 68 derives its inputs from adders 62 and 64 and therefore provides a zero output. Accordingly, the differential amplifiers 72 finds a high level positive signal at one input deriving from OR gate 67 and a zero from the other input, so that post detector filter 76 sees a high level positive signal and output circuit 74 responds with a mark.

The logic of the system as above outlined for the no fading condition, F1 being received, can by analogy be extended to similar conditions for reception of each of the other frequencies.

Assuming that F1 has faded, so that only frequencies F2, F3, F4 are received and during the times when F1 should be received, no reception takes place, the following operation ensues. For the stated conditions the outputs of QDTC will reverse, i.e. lead 41 will present zero signal, since during fading conditions or after fading conditions have established themselves the output of QDTC 35 will be zero as to both leads 41 and 42. Assuming that the remaining frequencies F2, F3, F4 are being transmitted and received, the signal on the output leads 41, 42 of the QDTC pertaining to each frequency will be present or not present according as the signal is being instantaneously received or not received. For this condition the OR gates 51 to 54 will show F1 absent and F2, F3, F4 absent while they are not being received, which includes the time when F1 would have been received in the absence of fading. The AND gate 55, on the other hand, depends on F2, F3, F4 absent signals and these signals are unaffected by the fading by hypothesis, so that an output will be present at AND gate which will place OR gate 65 in mark condition. Accordingly, the system will operate correctly despite the fact that F1 has faded.

By reasoning similar to that adopted in the preivous paragraph it can be shown that fading of any one of the frequencies will be compensated by information derived from the remainder of the frequencies.

The system of the invention may idle in one of its channels, and may idle by transmitting mark signals or space signals. The transmission of space signals only in channel one implies that F1 and F2 are not keying. This condition is treated as exemplary. Element 43 detects the fact that F1 and F2 are not keying when that condition has subsisted for a sufficient length of time, and provides an input signal to OR gates 51 and 52 to supplant the signals which would otherwise be present on leads 42 deriving from QDTC 35 and 36 to indicate F1 and F2 not present. Not keying circuit 43 requires the absence of two frequencies. This operation cannot take place due to fading since fading is assumed to subsist in respect to only one frequency at a time. If fading occurs on one of the transmitted frequencies, i.e. F3, F4, the system will continue to operate as if such fading had not occurred since not keying circuit 43 supplies the lack of not-present signals at frequencies F1 and F2, and the overall system logic is not varied from that which would occur if frequencies F1 and F2 were being transmitted and F3 fading.

Accordingly, the logic circuitry of FIGURE 1 serves (1) to operate normally in absence of fading, for either channel idling in either mark or space condition, (2) in the presence of single frequency fading, with or without idling in either channel on mark or space condition. The system accomplishes these results by sensing that either a single frequency is absent over a time period, while the remaining frequencies occur, or by additionally sensing that a predetermined frequency pair, representative of idle conditions in one channel, is continuously absent over a considerable time period, and inserting data accordingly into the logic circuitry which compensates for fading.

Figure 2:
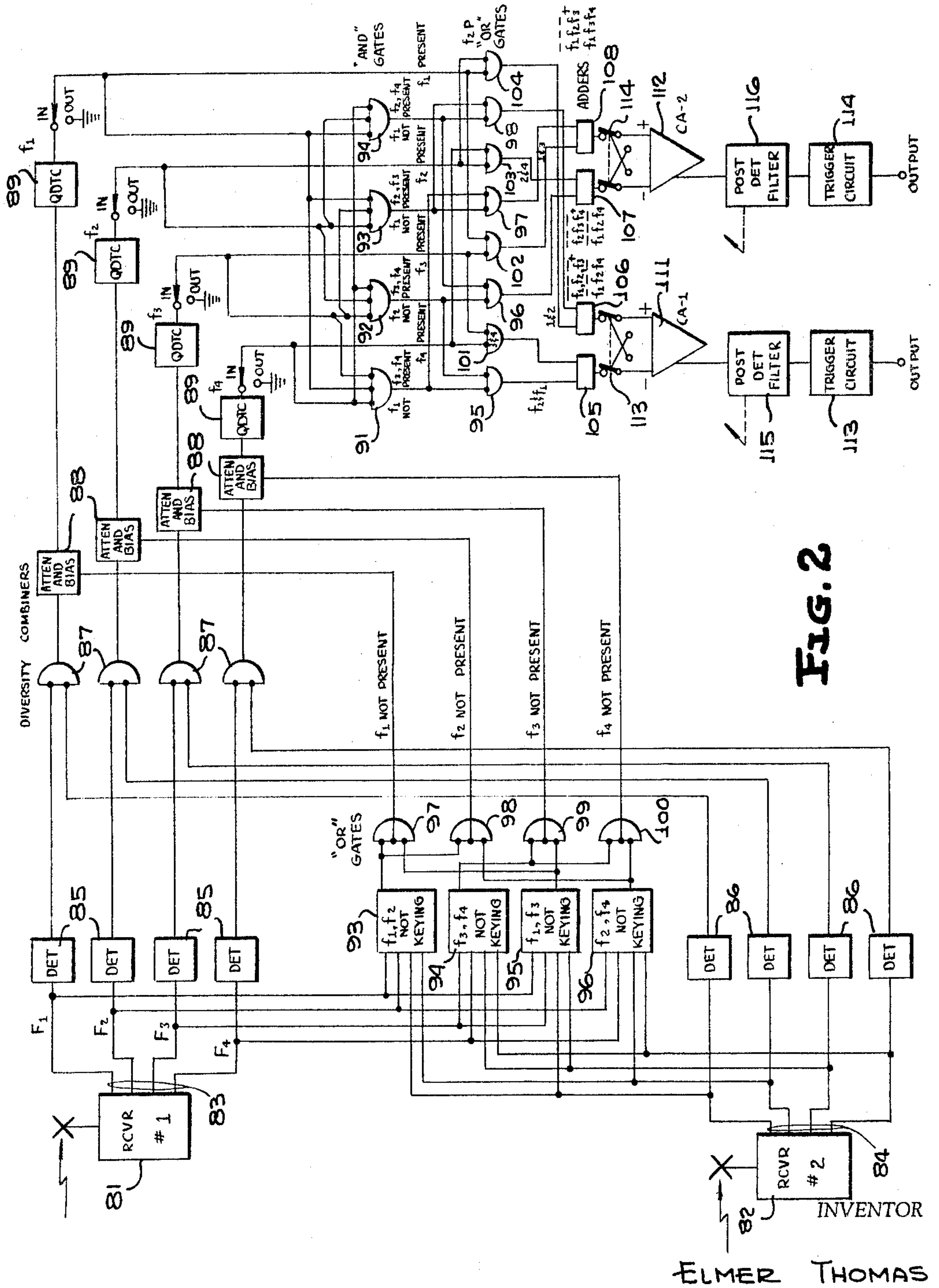
FIGURE 2 is a block diagram of a complete system, according to the invention, employing the logic of FIGURE 1.

Reference is now made to FIGURE 2 of the drawings, which illustrates in block diagram a further embodiment of the system of FIGURE 1. The system of FIGURE 2 includes a pair of diversity receivers 81 and 82 which are responsive to different carrier frequencies. Each of the carrier frequencies is simultaneously modulated by one of the audio frequencies F1, F2, F3 or F4. On leads 83 and 84, diversity receives 81 and 82 generate replicas of the received audio keying which are coupled respectively to separate detector circuits 85 and 86.

Connected in parallel with detectors 85 and 86 are not keying negative coincidence gates 93–96 which are responsive to audio frequency pairs in the same manner as the not keying negative coincidence gates 43–46 of FIGURE 2. The outputs of negative coincidence gates 93–96 are applied to a bank of OR gates 97–100, which derive separate switching signals indicative of F1, F2, F3 and F4 being not present for a substantial time interval. This is accomplished by connecting the outputs of not keying gates 93 and 95 to OR gate 97; connecting the outputs of not keying gates 93 and 95 to OR gate 98; connecting the outputs of gates 94 and 95 to OR gate 99; and connecting the outputs of gates 94 and 96 to OR gate 100, essentially to abstract an indication of the common not keying frequency. It is to be understood that feedback circuitry similar to that of the type illustrated in FIGURE 2 between not keying gates 43–46 may be provided between not keying gates 93–96 to prevent more than one signal being generated which is indicative of idling.

The outputs of detectors 85 and 86 which convey the same frequencies are combined in linear diversity combining networks 87. Thereby, an intelligence voltage is applied to each of the attenuation and bias networks 88, indicative of the net amplitude of the signals received by diversity receivers 81 and 82 on each information frequency of interest.

Attenuation and bias networks 88 are normally biased by the outputs of OR gates 97–100 to pass the outputs of diversity combiners 87 to quadruplex decision threshold computers (QDTC). However, if an output is generated by one of the OR gates 97–100, indicative of idling on one of the channels, the outputs of diversity combiners 87 are attenuated by networks 88 and the selected computer 89 is driven to a negative level.

The outputs of quadruplex threshold computers 89 consist of alternatively positive and negative variable amplitude pulses. The wave amplitude varies about a reference level by an amount dependent upon the carrier amplitude at the antennas of receivers 81 and 82 for the particular information frequency. A positive output of a computer 89 indicates the reception of the respective computer frequency, while a negative output thereof indicates that the computer frequency is absent.

The positive and negative outputs of computers 89 are fed to an array of AND and OR gates which feed linear adders and differential amplifiers. This array provides the mark and space outputs for the respective channels, as in FIGURE 2, allowance being made for the fact that positive and negative signals are employed rather than to only positive signals on alternate leads 41, 42.

To obtain absence information of three of the four signals at any one time, the negative outputs of computers 89 are fed to AND gates 91–94. AND gate 91 is responsive to the negative outputs of computers 89 to derive a negative signal only when frequencies F1, F3 and F4 are not present. At all other times, the output of gate 91 is zero. Gate 92 generates a negative output when frequencies F2, F3 and F4 are not present, as indicated by the negative outputs of the respective computers 89; gate 93 generates a negative output when frequencies F1, F2 and F3 are not present; and gate 94 generates a negative output only when frequencies F1, F2 and F4 are not present.

The not-present outputs of AND gates 91–94, which contain information that frequencies F2, F1, F4 and F3, respectively, are probably being received are fed in various combinations to OR gates 95–98. OR gates 95–98 generate negative outputs when either of the inputs thereto is negative and a zero value output when both of the inputs are of zero signal level. In response to the outputs of AND gates 91 and 92, OR gate 95 derives an output indicative of F1, F3 and F4 all not being present or of F2, F3 and F4 all not being present and therefore the probable reception of F1 or F2. In response to the output of AND gates 92 and 94, OR gate 96 derives an output indicative of F2, F3, F4 or F1, F2, F4 all not being present; hence, indicative of the probable reception of either F1 or F3. OR gate 97 is responsive to the outputs of AND gates 91 and 93 to generate a negative output when all of F1, F3 and F4 are not present or when all of F1, F2 and F3 are not present; hence, indicative of the probable reception of F2 or F4. OR gate 98 is responsive to the outputs of AND gates 93 and 94 to derive a negative signal indicative of the probable reception of F4 or F3.

The positive outputs of computers 89 are combined in four OR gates 101–104 which derive positive signals indicative of the largest amplitude signal applied thereto. In response to a positive out put from either the F3 or F4 computer 89, OR gate 101 generates a positive signal. In a similar manner, OR gates 102, 103 and 104 derive positive outputs in response to the positive outputs of F1 or F3, F2 or F4, and F1 or F2, of the respective computers 89.

Selected outputs from a pair of OR gates 95–104 are applied to one of four adders 105–108. In consequence, each adder is responsive to one OR gate which derives a positive output and another one which derives a negative output.

Adder 105 generates an output signal equal in value to the algebraic sum of the output signals of OR gates 95 and 101, which signal is applied to the negative input terminal of differential amplifier 111. The positive terminal of differential amplifier 111 is responsive to the output of adder 106 which algebraically combines the output signals of OR gates 98 and 104. The negative input terminal of differential amplifier 112 is responsive to the algebraic sum of the outputs of OR gates 96 and 103, the sum being formed by adder circuit 107. The positive terminal of differential amplifier 112 is responsive to the sum of the outputs of OR gates 97 and 102, which is generated by feeding these to linear combiner 108.

Connected between the input terminals of each of the differential amplifiers 111 and 112 and adders 105–108 inclusive, is a separate polarity reversing switch 113 and 114. Switches 113 and 114 are provided to assure the derivation of proper polarity outputs of differential amplifiers 111 and 112 for the mark and space signals in the channel which they represent.

In response to a net positive input to differential amplifier 111, a positive output is derived therefrom indicative of a mark signal in channel 1, while a negative input to differential amplifier 111 results in a corresponding output therefrom indicative of a space in channel 1. In a similar manner the positive and negative outputs of differential amplifier 112 are derived in response to the signals applied to its input terminals to generate the mark and space signals for channel 2.

The outputs of differential amplifiers 111 and 112 are coupled to trigger circuits 113 and 114 via post detection filters 115 and 116, respectively. Thereby trigger circuits 113 and 114 generate signals which are replicas of the signals at the transmitter in the respective first and second channels.

Figure 3:
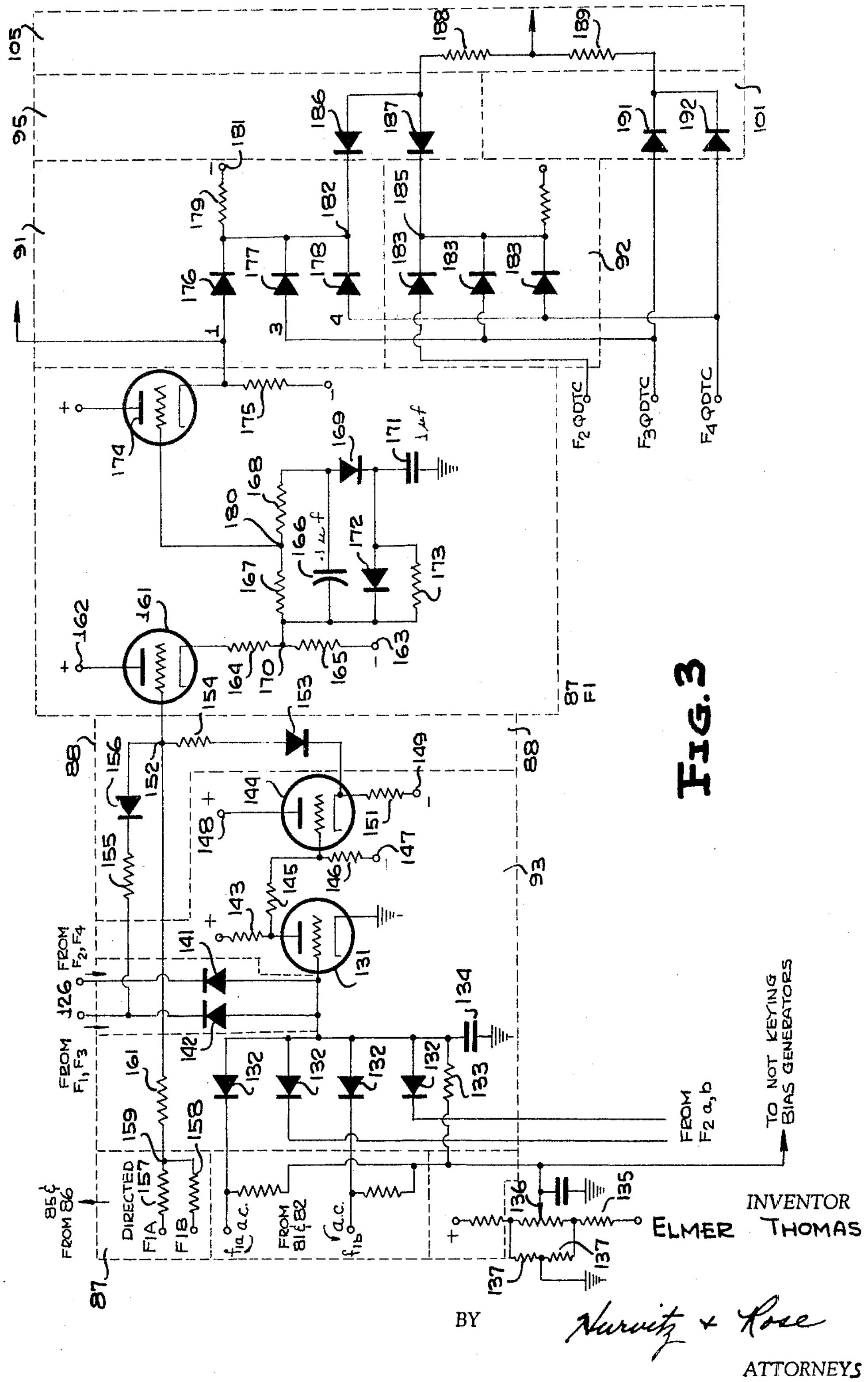
FIGURE 3 is a circuit diagram of a single computer channel, duplicates of which occur in the system of FIGURE 2.

Reference is now made to FIGURE 3 of the drawings, wherein is illustrated the circuitry in what is broadly considered as a single channel of the apparatus of FIGURE 2. The channel includes diversity combiner 87, which is responsive to the detected outputs indicative of signals at frequency F1 from receivers 81 and 82; not keying gate 93; attenuation and bias network 88 responsive to the F1 not-present output of OR gate 97; decision threshold computer (QDTC) 89 which provides the information indicative of F1; AND gates 91 and 92; OR gates 95 and 101; and adder 105.

Not keying gate 93 is responsive to the audio frequency signals derived from diversity receivers 81 and 82 indicative of frequencies F1 and F2. These audio signals are coupled to the grid of triode 131 via diode 132, the cathodes of diodes 132 being connected to their respective signal terminals and the anodes thereof all being connected to the grid of triode 131.

To provide a proper bias level for tube 131, each of the audio input signals from both diversity receivers is coupled via diodes 132 to integrating capacitor 134 connected to the grid of triode 131. D.C. bias is established by a network 135, which includes potentiometer 136 having its opposite ends connected via isolating resistors to positive and negative voltage supplies. The junction between the opposite ends of potentiometer 136 and the respective isolating resistors is connected to ground via biasing resistors 137. Thereby, the grid bias of tube 131 is established at an appropriate quiescent potential by the connection of slider 136 to the grid of tube 131 via resistor 133.

The outputs of not keying circuits 95 and 96 are coupled to the grid of triode 131 via OR gate 126, which includes diodes 141 and 142. The anode of each of the diodes 141 and 142 is connected to the grid of triode 141 while the cathodes thereof are connected to the output of the their respective not keying circuits.

The cathode of amplifying triode 131 is grounded while the anode thereof is connected to B+ source through load resistance 143. The output voltage developed across load resistance 143 is D.C. coupled to the grid of triode 144 via voltage dividing resistors 145 and 146. One end of resistor 146 is connected to negative biasing terminal 147 which maintains triode 144 cut off when tube 131 is conducting. Triode 144 is connected as a cathode follower, its anode being connected directly to B+ terminal 148 and its cathode being connected to a negative D.C. potential terminal 149 via output resistor 151. The output of triode 144, derived at its cathode, is coupled to not keying output terminal 152 by way of diode 153 and isolating resistor 154. The diode cathode is connected to the cathode of tube 144, the anode of which is connected to resistor 154. The output of not keying gate 93 is also connected to the output of not keying gate 95 via resistance 155 and diode 156, which is poled in a similar manner to diode 153 relative to output terminal 152.

The F1 detected waves derived from detectors 85 and 86 for frequency F1 are applied to terminal 152 via summing resistors 157 and 158, which are connected to the respective detectors and to terminal 159. Connected between terminals 152 and 159 is isolating resistor 161 which feeds the detected waves of diversity receivers 81 and 82 for frequency F1 to attenuation and bias network 88 which includes diodes 153 and 156.

When the system is receiving either frequency F1 or F2, the negative excursions of the detected audio voltage are applied to the grid of triode 131 because of the polarity of diodes 132. This negative excursion is of sufficient amplitude to drive triode 131 to cut-off, so that a positive voltage is applied to the grid of triode 144. This causes triode 144 to conduct, so that a positive voltage is derived at its cathode. This positive voltage is not coupled through diode 153 to terminal 152. Accordingly, the detected wave form derived from detectors 85 and 86 at terminal 159 is passed in a substantially unaltered manner through the attenuation and bias network 88.

When, however, both frequencies F1 and F2 have been absent for a sufficient period of time to discharge the negative voltage from capacitor 134, due to the lack of a negative signal applied thereto through diodes 132, triode 131 is rendered conductive. The positive voltage at the grid of tube 131 renders it conductive such that a negative voltage is fed to the grid of tube 144. This negative voltage causes tube 144 to be driven to cut off due to the negative bias at terminal 147. Hence, a negative voltage is applied to the cathode of diode 153 and a low impedance path is provided between terminal 152 and ground via resistors 151 and 154 and the negative supply. Accordingly, any positive signal, indicative of F1 being present, developed at terminal 159 is shunted diode 153 and is not coupled to the output of attenuator and bias network 88.

In a similar manner, a signal derived by not keying network 95 indicative of frequencies F1 and F3 not being received for a sufficient period of time to indicate channel two idling on a space, results in attenuation of the signal at terminal 159. This occurs due to the shunt path established through diode 156 and resistor 155 to the negative terminal of the cathode follower in network 95.

If, prior to absence of frequencies F1 and F2, not keying circuit 95 or 96 develops an output, a negative voltage is applied to the grid of triode 131 via diodes 141 or 142. Either of these voltages charges capacitor 134 to a sufficiently large negative value relative to that which is achieved by complete cut-off of diodes 132, that tube 131 is maintained in a cut-off condition. Hence, a not keying output for frequencies F1 and F2 is not developed by circuit 93 when either of the circuits 95 or 96 generates a not keying output prior to the simultaneous absence of frequencies F1 and F2.

The output of attenuation and bias network 88 is coupled to the grid of cathode follower triode 161 of computer 89. The magnitude of the detected output at terminal 152, in the absence of frequency F1, will be such as to cause triode 161 to conduct and establish a reference signal amplitude at terminal 170. If not keying circuit 93 generates an indication that frequencies F1 and F2 are not being received, the negative voltage at the terminal 149 is coupled to the grid of triode 161 to positively maintain it in cut-off condition.

The anode of triod 161 is connected directly to B+ terminal 162 and its cathode is connected to negative bias terminal 163 via voltage dividing resistor 164 and 165. The tap between resistors 164 and 165 is connected to the input of a control circuit. This circuit includes capacitor 166 which is shunted by a pair of equal voltage dividing resistors 167 and 168. Junction 180 between capacitor 166 and resistor 168 is connected to the anode of the diode 169, the cathode of which is connected through capacitor 171 to ground. Capacitor 171 is approximately ten times as great as capacitor 166 so that most of a positive voltage swing at junction 170, between resistors 164 and 165 appears across capacitor 166, a small remainder appearing across capacitor 171. A leakage path for capacitor 171, when it is not being charged, is provided by diode 172, which is shunted by leakage resistor 173. The anode of diode 172 is connected to capacitor 171 and its cathode to the junction between resistors 164 and 165.

In response to a positive signal at junction 152, a positive voltage is generated at the junction between resistors 164 and 165. Thereby capacitors 166 and 171 are charged approximately to nine-tenths and one tenth, respectively, of the positive input voltage. This occurs since diode 169 offers substantially no impedance to the flow of positive current therethrough it. A positive voltage equal to the voltage across capacitor 171 plus one-half the voltage across capacitor 166 is accordingly obtained at terminal 180 between resistors 167 and 168.

If the junction 170 is driven in a negative direction to a reference potential in response to a signal indicating F1 not-present shortly after it is driven in a positive direction, capacitor 166 is still charged to substantially the same voltage to which it was changed by the positively going voltage, but capacitor 177 is driven to the reference input voltage due to its connection to input 170 junction via diode 172. Hence, the voltage at terminal 180 is the reference voltage across capacitor 171 plus one-half the positive stored voltage across capacitor 166. If junction 170 is again driven positively before capacitor 166 can discharge through resistors 167 and 168 to any appreciable extent, capacitors 166 and 171 are restored to the same charge conditions which they had during the previous positive input pulse.

As fading occurs, at frequency F1, the positive level at terminal 170 is reduced, while F1 is being received, but the negative level is maintained constant when F1 is absent. Hence, the charge stored in capacitor 166, indicative of F1 being present, is reduced so that both the positive and negative voltage swings at terminal 180 are reduced. However, the positive swing is not reduced on a proportionate basis, but is reduced by an amount indicative of the negative level at which terminal 170 is maintained when F1 is not present.

When F1 has been received for a long period of time, so that the voltage at junction 170 has been positive for a relatively long time interval, capacitor 166 discharges through resistors 167 and 168 and capacitor 171 is charged to the input voltage. Hence, the output at the tap between resistors 167 and 168 is driven to a voltage equal to the positive input. In a similar manner a long duration low level voltage at terminal 170, indicative of channel one idling on a space, causes capacitor 166 to discharge so that the voltage at terminal 180 is driven to a low reference voltage if idling circuit 93 is not activated. In response to activation of idling circuit 93, terminal 152 is driven to a very large negative voltage to cut-off tube 161. This causes terminal 170 to be driven to the negative supply potential at terminal 163, resulting in terminal 180 quickly being driven to a large negative voltage.

The variable amplitude signal at terminal 180 is coupled to the grid of cathode follower 174 to control its conduction. When strong signals are received, tube 174 is positively driven from a state of strong conduction to a state of weak conduction. In response to fading, however, the tube input is frequently insufficient to cause great differences in the conduction of tube 174. Under quiescent conditions, when signal F1 is not being received and no fading occurs, the cathode 174 is maintained at ground potential, the reference level for gates 91–104, FIGURE 2. In response to an F1 mark status, the output of cathode follower 174 is driven positive to prevent AND gates 91, 93, 94 opening and to cause opening of OR gates 102 and 104.

AND gate 91 includes diodes 176, 177 and 178, which have their anodes connected to the outputs of computers 89 associated with frequencies F1, F3, and F4, respectively. The cathodes of each of the diodes 176–178 is connected via isolating resistor 179 to negative bias terminal 181. Diodes 176–178 of AND gate 91 are responsive to the negative outputs of their respective computers, so that the negative voltage at bias terminal 181 is coupled to output terminal 182 only when all of the diodes are conducting.

Diodes 183 of AND gate 92 are poled in a similar manner so that the negative bias voltage at terminal 184 is coupled to output terminal 185 only when a negative not-present signal is generated by each of the F2, F3 and F4 computers 89.

Output terminals 182 and 185 of AND gates 91 and 92 are coupled to the cathodes of diodes 186 and 187, respectively, which constitute OR gate 95. Diodes 186 or 187 are capable of coupling only negative voltages at terminals 182 or 185 to resistor 188 which is included in adder 105. If one input to each of the AND gates 91 and 92 is positive, the voltage at terminals 182 or 185 is positive so that these is a zero input voltage to resistor 188.

Adder 105 includes a further resistor 189 which is responsive to the output of OR gate 101. OR gate 101 includes diodes 191 and 192, which are poled to pass the respective positive outputs of the F3 and F4 computers 89. It is thus seen that one input to adder 105 is either positive or zero and the other input is either negative or zero, to derive the subtrahend input for differential amplifier 111. From the foregoing description it is believed apparent how the remaining inputs to differential amplifiers 111 and 112 are generated.

It is to be understood that the principles embodied in the present invention may be extended to more complex systems than double frequency shift key receivers. For instance, similar techniques are utilizable with a three channel system employing eight frequencies to represent the various mark and space combinations.

While I have described and illustrated specific embodiment of my invention, it will be clear that variations of the details of construction which are specifically illustrated and described may be resorted to without departing from the true spirit and scope of the invention as defined in the appended claims.

What is claimed is:

1. A double channel frequency shift keying receiver system responsive to four signals indicative of levels of information at frequencies F1, F2, F3 and F4, comprising a separate computer for each of said frequencies, each of said computers deriving variable level signals indicative of the presence and absence of its respective frequency, the level of signals generated by each computer being controlled by the level of the respective presence frequency, means responsive to the absence signals of three of said computers for deriving signals indicating the probable presence of the fourth freqeuncy, means for combining each of said fourth frequency signals with the corresponding presence signals generated by said computers whereby four combined signals are derived, means responsive to selected pairs of said combined signals for generating mark and space signals indicative of the status of the first channel of said system, and means responsive to a different selected pair of said combined signals for generating mark and space signals indicative of the status of the second channel of said system.

2. A double channel frequency shift keying receiver system responsive to four signals indicative of frequencies F1, F2, F3 and F4, comprising a separate computer for each of said frequencies, each of said computers deriving signals indicative of the presence and absence of its respective frequency, means responsive to the absence signals of three of said computers for deriving signals indicating the probable reception of the fourth frequency, means for combining each of said fourth frequency signals with the corresponding presence signal derived from said computers, whereby four combined signals are derived, means responsive to selected pairs of said combined signals for generating mark and space signals indicative of the status of the first channel of said system, and means responsive to a different selected pair of said combined signals for generating mark and space signals indicative of the status of the second channel of said system.

3. A double channel frequency shift keying receiver system responsive to four signals indicative of frequencies F1, F2, F3 and F4, comprising a separate computer for each of said frequencies, each of said computers deriving variable level signals indicative of the presence and absence of its respective frequency, means responsive to the absence signals of three of said computers for deriving signals indicating the probable reception of the fourth frequency, means for combining each of said fourth frequency signals with the corresponding presence signal derived from said computers, whereby four combined signals are derived, and means responsive to said combined signals for generating mark and space indications of the first and second channels of said system.

4. A double channel frequency shift keying receiver system responsive to four signals indicative of frequencies F1, F2, F3 and F4, comprising a separate computer for each of said frequencies, each of said computers deriving signals indicative of the presence and absence of its respective frequency, the level of both of said signals derived by each computer being controlled by the level of the signal of respective frequency, means responsive to the absence signals of three of said computers for deriving signals indicating the probable reception of the fourth frequency, means for combining each of said fourth frequency signals with the corresponding presence signal derived from said computers, whereby four combined signals are derived, and means responsive to said combined signals for generating mark and space indications in the first and second channels of said system.

5. A double channel frequency shift keying receiver system responsive to four signals indicative of the frequencies F1, F2, F3 and F4, comprising a separate computer for each of said frequencies, each of said computers deriving signals indicative of the presence and absence of its respective frequency, means responsive to the absence signals of three of said computers for deriving signals indicating the probable reception of the fourth frequency, means for combining each of said fourth frequency signals with the corresponding presence signal derived from said computers, whereby four combined signals are derived, means responsive to selected pairs of said combined signals for generating mark and space signals indicative of status of the first channel of said system, and means responsive to a different selected pair of said combined signals for generating mark and space signals indicative of status of the second channel of said system.

6. A double channel frequency shift keying receiver system responsive to four signals indicative of frequencies F1, F2, F3 and F4, comprising a separate computer for each of said frequencies, each of said computers deriving variable level signals indicative of the presence and absence of its respective frequency, the level of both of said signals derived by each computer being controlled by the level of the respective frequency, means responsive to the absence signals of three of said computers for deriving signals indicating the probable reception of the fourth frequency, wherein said fourth frequency selectively equals F1, F2, F3 and F4, means for combining each of said fourth frequency signals with the corresponding present signal derived from said computers whereby four combined signals are derived, and means responsive to said combined signals for generating mark and space indications of the first and second channels of said system.

7. In a multiple channel frequency shift keying receiver responsive to a multiplicity of input signals indicative of the levels of *n* information frequencies F1, F2 . . . F*n*, comprising a separate computer for each of said frequencies, each of said computers deriving signals indicative of the presence and absence of its respective frequency, means responsive to the absence signals of all of said computers, but the one for F*i*, for deriving signals indicating the probable reception of F*i*, wherein F*i* selectively equals F1, F2 . . . F*n*, means for combining each of said F*i* signals with the corresponding presence signal derived from each of said computers, whereby *n* combined signals are derived, and means responsive to said *n* signals for deriving mark and space indications of each channel of said system.

8. In a multiple channel frequency shift keying receiver responsive to a multiplicity of input signals indicative of *n* information frequencies F1, F2 . . . F*n*, comprising a separate computer for each of said frequencies, each of said computers deriving variable level signals indicative of the presence and absence of its respective freqeuncy, means responsive to the absence signals of all of said computers, but the one for F*i*, for deriving signals indicating the probable reception of F*i*, wherein F*i* selectively equals F1, F2 . . . F*n*, means for combining each of said F*i* signals with the corresponding presence signal derived from each of said computers, whereby *n* combined signals are derived, and means responsive to said *n* signals for deriving mark and space indications of each channel of said system.

9. A multiple channel frequency shift keying receiver responsive to a multiplicity of input signals indicative of the levels of *n* information frequencies F1, F2 . . . F*n*, comprising a separate computer for each of said frequencies, each of said computers deriving signals indicative of the presence and absence of its respective frequency, the level of said signals derived by each computer being controlled by the level of the respective frequency, means responsive to the absence signals of all of said computers but the one for F*i*, for deriving signals indicating the probable reception of F*i*, wherein F*i* selectively equals F1, F2 . . . F*n*, means for combining each of said F*i* with the corresponding present signal derived from each of said computers, whereby *n* combined signals are derived, and means responsive to said *n* signals for deriving mark and space indications of each channel of said system.

10. A multiple channel frequency shift keying receiver responsive to a multiplicity of input signals indicative of *n* information frequencies F1, F2 . . . F*n*, comprising a separate computer for each of said frequencies, each of said computers deriving signals indicative of the presence and absence of its respective frequency, means responsive to said input signals for deriving a multiplicity of indications, each of said indications being representative of one of said channels idling, means responsive to the absence signals of all of said computers but the one for F*i* and said idling indications for deriving signals indicating the probable reception of F*i*, wherein F*i* selectively equals F1, F2 . . . F*n*, means for combining each of said F*i* with the corresponding presence signal derived from each of said computers, whereby *n* combined signals are derived, and means responsive to said *n* signals for deriving mark and space indications of each channel of said system.

11. A double channel frequency shift keying receiver system responsive to four signals indicative of information frequencies F1, F2, F3 and F4 comprising a separate computer for each of said frequencies, each of said computers deriving signals indicative of the presence and absence of its respective frequency, means responsive to selected pairs of said input signals for deriving four signals indicating idling of one of said channels, means responsive to the absence signals of three of said computers and selected ones of said idling indicating signals for deriving signals indicating the probable reception of the fourth frequency, wherein said fourth frequency selectively equals F1, F2, F3 and F4, means for combining each of said fourth frequency signals with the corresponding presence signal derived from said computers, whereby four combined signals are derived, means responsive to selected pairs of said combined signals for generating mark and space signals indicative of the status of the first channel of said system, and means responsive to different selected pairs of said combined signals for generating mark and space signals indicative of the status of the second channel of said system.

12. In a multiple channel frequency shift keying receiver arranged to provide responses representing each of a plurality of frequencies one at a time at random times in keying sequence, and wherein fading may occur slowly in comparison with the keying rate on any one only of said frequencies at any one time, means responsive to said frequencies for generating distinguishable signals representative respectively of presence and absence of each of said frequencies, logic circuitry responsive to all said signals for regenerating responses deleted by said fading wherein a selected pair of said frequencies may be absent over a long time period to indicate idling of one of said channels, means for generating a control voltage responsive to said absence, and means applying said control voltage to said computer in substitution for certain of said responses.

13. In a multiple channel frequency shift keying system, wherein one of said channels may be in idling condition and wherein idling condition as noise or space is indicated by non-transmission of selected pairs of frequencies, and wherein fading may occur on only one of the transmitted frequencies, means for sensing absence of only one of said pairs of frequencies and for generating a control signal indicative of said absence means for sensing both absence and presence of each single transmitted frequency and for generating responses representative respectively of absence and presence of each single transmitted frequency, and computer circuitry responsive to said control circuitry and to said responses for correctly actuating said channels during fading and idling of said transmissions.

14. In a multiple channel frequency shift keying receiver, wherein frequencies are received one at a time, wherein fading may occur as to only one frequency at a time, and wherein the fading rate is far slower than the keying rate, a computer system responsive during said fading to the non-fading frequencies for generating signals timed to coincide with the fading signals, and wherein said computer system includes means for deriving pulses representative of non-reception of each of said non-fading frequencies and pulses representative of reception of each of said non-fading signals, further includes logic circuitry responsive to said pulses to generate said last named signals, means for sensing long term absence of a pair of said frequencies implying an idling condition on one of said channels, means for generating a D.C. signal indication of said absence and means for inserting said D.C. signal into said logic circuitry.

References Cited by the Examiner

UNITED STATES PATENTS

| | | | |
|---|---|---|---|
| 2,882,338 | 4/1959 | Wozencraft | 325—320 |
| 2,928,897 | 3/1960 | Koolhof | 178—69 |
| 3,214,691 | 10/1965 | Sproul et al. | 325—30 |

DAVID G. REDINBAUGH, *Primary Examiner.*

J. W. CALDWELL, *Assistant Examiner.*